United States Patent
Erickson et al.

(10) Patent No.: US 6,525,142 B1
(45) Date of Patent: Feb. 25, 2003

(54) MONOHYDROXYLATED DIENE POLYMERS AND EPOXIDIZED DERIVATIVES THEREOF

(75) Inventors: James Robert Erickson, Katy, TX (US); David John St. Clair, Houston, TX (US); Michael Alan Masse, Richmond, TX (US)

(73) Assignee: Kraton Polymers U.S. LLC, Houston, TX (US)

(*) Notice: Subject to any disclaimer, the term of this patent is extended or adjusted under 35 U.S.C. 154(b) by 0 days.

(21) Appl. No.: 08/399,864

(22) Filed: Mar. 7, 1995

Related U.S. Application Data

(62) Division of application No. 08/320,807, filed on Oct. 11, 1994.

(51) Int. Cl.$^7$ .............................................. C08F 210/16
(52) U.S. Cl. ................. 525/314; 525/331.7; 525/331.9; 525/332.8
(58) Field of Search .............................. 525/314, 331.7, 525/331.9, 332.8

(56) References Cited

U.S. PATENT DOCUMENTS

| | | | |
|---|---|---|---|
| 3,269,978 A | * 8/1966 | Short et al. ................. | 524/572 |
| 3,308,170 A | * 3/1967 | Pritchett et al. ............ | 568/857 |
| 4,237,245 A | 12/1980 | Halasa et al. ................ | 525/272 |
| 4,518,753 A | * 5/1985 | Richards et al. ............ | 526/177 |
| 5,115,019 A | 5/1992 | Marx et al. .................... | 525/65 |
| 5,149,895 A | 9/1992 | Coolbaugh et al. ......... | 526/173 |
| 5,169,910 A | 12/1992 | Corley ........................ | 525/481 |
| 5,191,024 A | 3/1993 | Shibata et al. ............... | 525/314 |
| 5,210,359 A | 5/1993 | Coolbaugh et al. ......... | 526/173 |
| 5,229,464 A | 7/1993 | Erickson et al. ............ | 525/314 |
| 5,247,026 A | 9/1993 | Erickson et al. ......... | 525/331.9 |
| 5,332,783 A | 7/1994 | Dillman et al. ............... | 525/92 |
| 5,376,745 A | * 12/1994 | Handlin, Jr. et al. ........ | 526/178 |

FOREIGN PATENT DOCUMENTS

| | | |
|---|---|---|
| EP | 0396780 A1 | 11/1989 |
| EP | 0441485 A2 | 1/1991 |
| JP | 62-178718 | 7/1987 |
| JP | 02-275256 | 10/1990 |
| JP | 02-409745 | 12/1990 |

OTHER PUBLICATIONS

"Vinyl Ethers: Versatile Monomers for Coatings Applications," W. J. Burlant, J. S. Plotkin, F. J. Vara, International Specialty Products, RadTech Asia '91, Osaka, Japan, Apr. 1991.

* cited by examiner

*Primary Examiner*—Edward J. Cain

(57) ABSTRACT

The invention herein relates to unsaturated monohydroxylated polydiene polymers which are comprised of at least two polymerizable ethenically unsaturated hydrocarbon monomers wherein at least one is a diene monomer which yields unsaturation suitable for epoxidation. The invention also encompasses partially hydrogenated and/or epoxidized derivatives of these novel monohydroxylated polydiene polymers. The preferred monohydroxylated polydiene polymer of the present invention has a structural formula

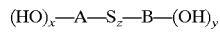

$$(HO)_x\text{—}A\text{—}S_z\text{—}B\text{—}(OH)_y$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks. The A blocks have a molecular weight of from 100 to 6000, preferably 500 to 4,000, and most preferably 1000 to 3000, and the B blocks have a molecular weight of from 1000 to 15,000, preferably 2000 to 10,000, and most preferably 3000 to 6000. S is a vinyl aromatic hydrocarbon block which may have a molecular weight of from 100 to 10,000. x and y are 0 or 1. Either x or y must be 1, but only one at a time can be 1. z is 0 or 1. Either the A or the B block may be capped with a miniblock of polymer, 50 to 1000 molecular weight, of a different composition, to compensate for any initiation, tapering due to unfavorable copolymerization rates, or capping difficulties. These polymers may be epoxidized such that they contain from 0.1 to 7.0 milliequivalents (meq) of epoxy per gram of polymer.

7 Claims, No Drawings

MONOHYDROXYLATED DIENE POLYMERS AND EPOXIDIZED DERIVATIVES THEREOF

This is a division of application Ser. No. 08/320,807, filed Oct. 11, 1994.

BACKGROUND OF THE INVENTION

This invention relates to novel monohydroxylated diene polymers which are suitable for use in a variety of applications including adhesives, sealants, coatings, modification of other polymers or asphalt, etc., as well as to be further functionalized to produce useful polymers. More specifically, the invention relates to particular epoxidized monohydroxylated polydiene polymers and their epoxidized derivatives.

Monohydroxylated polydienes are known. Most of these polymers are homopolymers of one diene or another. For example, monohydroxlated polybutadienes are known in the art for use in adhesive formulations. U.S. Pat. No. 4,242,468 describes solventless polyurethane coatings having improved flexibility resulting from incorporation of monohydroxylated polybutadienes. Epoxidized versions of hydroxylated polybutadienes are known as well. Low viscosity epoxidized polydiene polymers are also known, especially for use in adhesives. Such polymers are described in commonly assigned U.S. Pat. Nos. 5,229,464 and 5,247,026.

While the low viscosity polymers of the prior art are useful in applications where aliphatic epoxies are generally employed., they suffer the disadvantage of not being reactive via a broader class of chemistry. Further, epoxidation is costly and many examples of the prior art required high levels of epoxy functionality to be of utility. Incorporation of a more economical moiety which would provide the same or broader chemical utility is highly desirable. The present invention provides polymers which overcome the disadvantages of the aforementioned limited chemical reactivity. Further, in applications requiring epoxy functionality for chemical compatibility these polymers reduce the necessary epoxy levels.

SUMMARY OF THE INVENTION

This invention is a monohydroxylated polydiene polymer which is comprised of at least two polymerizable ethenically unsaturated hydrocarbon monomers wherein at least one is a diene monomer which yields unsaturation suitable for epoxidation. The invention also contemplates partially unsaturated and/or epoxidized derivatives of these novel monohydroxylated polydiene polymers. The hydroxylated polymers are preferably block copolymers of at least two diene monomers, preferably isoprene and butadiene, and, optionally, a vinyl aromatic hydrocarbon wherein a hydroxyl group is attached at one end of the polymer molecule. These polymers may be hydrogenated or unhydrogenated but they are preferably epoxidized.

The preferred monohydroxylated polydiene polymer of the present invention has the structural formula

$$(HO)_x\text{—}A\text{—}S_z\text{—}B\text{—}(OH)_y \quad (I)$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks. The A blocks have a molecular weight of from 100 to 6000, preferably 500 to 4,000, and most preferably 1000 to 3000, and the B blocks have a molecular weight of from 1000 to 15,000, preferably 2000 to 10,000, and most preferably 3000 to 6000, S is a vinyl aromatic hydrocarbon block which may have a molecular weight of from 100 to 10,000, x and y are 0 or 1. Either x or y must be 1, but only one at a time can be 1, z is 0 or 1. Either the, A or the B block may be capped with a miniblock of polymer, 50 to 1000 molecular weight, of a different composition, to compensate for any initiation, tapering due to unfavorable copolymerization rates, or capping difficulties. These polymers may be epoxidized such that they contain from 0.1 to 7.0 milliequivalents (meq) of epoxy per gram of polymer.

DETAILED DESCRIPTION OF THE INVENTION

Polymers containing ethylenic unsaturation can be prepared by anionically copolymerizing one or more olefins, particularly diolefins, by themselves or with one or more alkenyl aromatic hydrocarbon monomers. The copolymers may, of course, be random, tapered, block or a combination of these.

Diene containing polymers, having residual unsaturation suitable for epoxidation, may also be obtained by other means of polymerization, such as by cationic polymerization or free radical polymerization. Using cationic polymerization, monomers such as substituted 1-butenes, 1-pentenes and dienes such as isoprene and butadiene can be copolymerized. Like anionic polymerization, living cationic polymerization allows the copolymers to be block copolymers such that the residual diene double bond can be localized within the polymer. Dienes may be polymerized together with acrylic monomers by initiation with a free radical initiator, such a peroxide or AIBN. For pressure sensitive adhesive applications, monomers such as n-butyl acrylate, 2-ethyl-hexyl acrylate and isoprene may be used, and other modifying monomers, such as acrylic acid or 2-hydroxy-ethyl acrylate may also be used. Other polymerization methods including coordination/insertion mechanisms such as Ziegler-Natta polymerizations, metallocene polymerizations, and metathesis polymerizations can also be used to make polymers such as these.

The polymers containing ethylenic unsaturation or both aromatic and ethylenic unsaturation may be prepared using anionic initiators or polymerization catalysts. Such polymers may be prepared using bulk, solution or emulsion techniques. When polymerized to high molecular weight, the polymer containing at least ethylenic unsaturation will, generally, be recovered as a solid such as a crumb, a powder, a pellet or the like. When polymerized to low molecular weight, it may be recovered as a liquid.

In general, when solution anionic techniques are used, copolymers of conjugated diolefins, optionally with vinyl aromatic hydrocarbons, are prepared by contacting the monomer or monomers to be polymeized simultaneously or sequentially with an anionic polymerization initiator such as group IA metals, their alkyls, amides, silanolates, napthalides, biphenyls or anthacenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The monohydroxylated polydienes are synthesized by anionic polymerization of conjugated diene hydrocarbons with lithium initiators. This process is well known as described in. U.S. Pat. No. 4,039,593 and Re. No. 27,145 which descriptions are incorporated herein by reference. Polymerization commences with a monolithium initiator which builds a living polymer backbone at each lithium site. Typical monolithium living polymer structures containing conjugated diene hydrocarbons are:

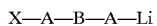

wherein B represents polymerized units of one conjugated diene hydrocarbon such as butadiene, A represents polymerized units of another conjugated diene such as isoprene, and either A or B may contain one or more vmyl aromatic compounds such as styrene, and X is the residue of a monolithium initiator such as sec-butyllithium. The hydroxyl groups are added by terminal capping the polymerization with oxiranes such as ethylene oxide followed by termination with methanol.

Monohydroxy diene polymers can also be made using a mono-lithium initiator which contains a hydroxyl group which has been blocked as the silyl ether. Details of the polymerization procedure can be found in U.S. Pat. No. 5,396,745, which is herein incorporated by reference. A suitable initiator is hydroxyporoyllithium in which the hydroxyl group is blocked as the tert-butyl-dimethylsilyl ether. This mono-lithium initiator can be used to polymerize isoprene or butadiene in hydrocarbon or polar solvent. The living polymer is then terminated with methanol. The silyl ether is then removed by acid catalyzed cleavage in the presence of water yielding the desired monohydroxy polydiene polymer.

When one of the conjugated dienes is 1,3-butadiene and it will be hydrogenated, the anionic polymerization of the conjugated diene hydrocarbons is typically controlled with structure modifiers such as diethylether or glyme (1,2-diethoxyethane) to obtain the desired amount of 1,4-addition. As described in U.S. Pat. No. Re 27,145 which is incorporated by reference herein, the level of 1,2-addition of a butadiene polymer or copolymer can greatly affect elastomeric properties after hydrogenation. The hydrogenated polymers exhibit improved heat stability and weatherability in the final adhesive, sealant or coating.

The most highly preferred polymers for use herein are diblock polymers which fall within the scope of formula (I) above. The overall molecular weight of such diblocks may range from 1500 to 20000, preferably 3000 to 7000. Either of the blocks in the diblock may contain some randomly polymerieed vinyl aromatic hydrocarbon as described above. For example, where I represents isoprene, B represents butadiene, S represents styrene, and a slash (/) represents a random copolymer block, the diblocks may have the following structures:

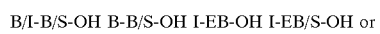

where EB is hydrogenated butadiene, -EB/S-OH means that the hydroxyl source is attached to a styrene mer, and -S/EB-OH signifies that the hydroxyl source is attached to a hydrogenated butadiene mer. This latter case, -S/EB-OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the correponding triblock polymers. It is preferred that the hydroxyl be attached to the butadiene block because the epoxidation proceeds more favorably with isoprene and there will be a separation between the functionalities on the polymer. However, the hydroxyl may also be attached to the isoprene block if desired. This produces a more surfactant-like molecule with less load bearing capacity. The isoprene blocks may also be hydrogenated.

Certain triblock copolymers are also preferred for use herein. Such triblocks usually include a styrene block or randomly copolymerized styrene to increase the polymers glass transition temperature, compatibility with polar materials, strength, and room temperature viscosity. These triblocks include the following specific structures:

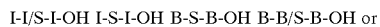

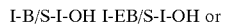

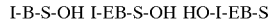

The latter group of polymers specified in the last line above wherein the styrene block is external are represented by the formula

 (II)

where A, B, S, x, and y are as described above.

Epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerizedy or, alternatively, the polymer can be redissolved in an inert solvent. These methods are described in more detail in U. S. Pat. Nos. 5,229,464 and 5,247,026 which are herein incorporated by reference. In particular, we have found that when using peracetic acid for the epoxidation, the rate of epoxidation of residual aliphatic double bonds in polyisoprene and polybutadiene is the following, 1,4-polyisoprene mers (tri-substituted aliphatic double bonds)>1,4-polybutadiene mers (1,2di-substituted aliphatic double bonds)>3,4-polyisoprene mers (1,1-di-substituted aliphatic double bonds)>1,2-polybutadiene mers (mono-substituted aliphatic double bonds). Neither 1,2-polybutadiene mers nor polystyrene mers have been observed to epoxidize.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

If desired, these block copolymers can be partially hydrogenated. Hydrogenation may be effected selectively as disclosed in U.S. Pat. No. Reissue 27,145 which is herein incorporated by reference. The hydrogenation of these polymers and copolymers may be carried out by a variety of well established processes including hydrogenation in the presence of such catalysts. as Raney Nickel, nobel metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference. Partially unsaturated hydroxylated polymers are preferred for further functionalization such as to make the epoxidized polymers of this. invention. They can also be chlorinated, brominated, or reacted with maleic anhydride, or used directly for vulcanization or reaction with amino resins. The partial unsaturation preferably is such that 0.1 to 7 meq/g of aliphatic double bonds remain for subsequent epoxidation.

The epoxidized derivatives of these polymers may be used in pressure sensitive adhesives, films, sealants, coatings, structural adhesives, laminating adhesives, pressure sensitive structural adhesives, printing plates, and in the modification of other polymers and/or asphalt (i.e., blends with other polymers andor asphalt for the purpose of altering the properties of those materials). The unepoxidized polymers may be used in applications for which other monohydroxlated polymers have been commonly used, including as part of a binder system for adhesives. However, their primary utility is to be functionalized, such as by epoxidation, to form useful functionalized derivatives.

EXAMPLES

In the examples several adhesives tests are used to demonstrate the properties of test formulations using the improved binders of this invention. The degree of covalent cure obtained for each of the adhesive samples was measured by use of a polymer gel content test developed by J. R. Erickson for radiation curing adhesives, and first described in the article "Experimental Thermoplastic Rubbers for Enhanced Radiation Crosslinkng of Hot Melt PSA's", TAPPI 1985 Hot Melt Symposium Proceedings, June 1985. The method as practiced for the present examples is essentially identical to the method as published, but for a few minor improvements and corrections. The w % values indicate the weight percentage of the binder polymers that are covalently attached to the three dimensional gel network. 180° Peel from polished steel was determined using Pressure Sensitive Tape Council Method No. 1. Large values indicate high strength when peeling a test tape form the substrate. Loop Tack (LTD.) was determined using a TLMI Loop Tack Tester. Polyken Probe Tack (PPI) was determined by ASTM D2979. High values for LTD. and PPT indicate aggressive tack. Holding Power (HP) is the time required to pull a standard area (1 in×1 in) of tape from a standard test surface (Mylar, steel) under a standard load (500 g, 2 Kg), in 2° antipeel (Pressure Sensitive Tape Council Method No. 7), at a certain temperature (23° C., 95° C.). Long times indicate high adhesive and cohesive strength. Shear Adhesion Failure Test (SAFT) is similar to HP, except that the temperature at which failure occurs is recorded. SAFT is carried out in a oven that ramps up at a rate of 40° F. per hour. High temperature values indicate high cohesive and adhesive strength.

A number of the polymers are used in the binder systems for examples 1 and 2. Many of their important characteristics are given in the table below.

TABLE I

| Polymer No. | Type | Peak MW | Constituent monomer blocks* | Meq/g OH | Meq/g epoxy |
|---|---|---|---|---|---|
| 3 | epoxidized linear monohydroxy diene polymer | 6,000 | I-EB-OH** | 0.17 | 1.5 |
| 4 | linear monohydroxy diene polymer | 3,000 | EB-OH | 0.33 | 0 |
| 5 | linear monohydroxy diene polymer | 6,000 | I-EB-OH | 0.17 | 0 |
| 6 | linear dihydroxy diene polymer | 4,000 | OH-B-OH | 0.50 | 0 |
| 7 | linear dihydroxy diene polymer | 4,000 | HO-EB-OH | 0.50 | 0 |
| 13 | epoxidized linear monohydroxy diene polymer | 6,000 | I-S/EB-OH# | 0.17 | 1.5 |

*I is polyisoprene, B is polybutadiene EB is polyethylene-butylene (fully hydrogenated polybutadiene), and OH is primary hydroxy from ethylene oxide capping.
**The polyisoprene was partially hydrogenated and then epoxidized with peracetic acid.
Polymer 13 is a polymer described by structural formula I, specifically, I-S/EB-OH, where an EB miniblock is added to assure addition of ethylene oxide to a living butadiene mer.

A number of other formulation ingredients are also used in the examples, and they are described in the table below.

Description of Formulation Ingredients in the Examples

| Name | Description | Supplier |
|---|---|---|
| UVI 6974 | sulfonium salt cationic photoinitiator | Union Carbide |
| Irganox ® 1010 | phenolic type antioxidant | Ciba-Geigy |
| Regalrez ® 1085 | hydrogenated tackifying resin | Hercules |

Example 1

Adhesive 1-Q, shown in Table 1, was prepared, cast, and cured by solvent mixing all of the ingredients at room temperature using tetrahydrofuran (THS) as the solvent. The adhesive solution was cast onto a clean 1 mil Mylar sheet. Final dry film thickness of the adhesive was 5 mils. The test film was directly UV cured, with the adhesive facing the incoming radiation at 30 feet per minute (fpm) conveyor speed under a single medium pressure $H_g$ bulb, using a Linde Photocure processor. A nitrogen atmosphere was used only for the purpose of reducing ozone from the bulb, as cationic systems do not need an oxygen free atmosphere to cure. A lightbug was also passed under the lamp to measure the radiation dose. A dose of 150–160 mJ/cm was recorded. Immediately after the UV exposure, the test adhesive was postbaked for 10 minutes at 121° C. It was tested for properties which are also shown in Table 1.

Adhesive 1-Q is an example where the epoxidized diene polymer also contains a hydroxy group. The cure of 1-Q is excellent, as are its aggressive tack and SAFT. It gives all indications of having excellent cohesive strength, yet it exhibited viscous splitting during the room temperature HP test, an apparent spurious result.

TABLE 1

Monohydroxy Diene Polymer Binder
100 part formulations shown with results

| | 1-Q |
|---|---|
| Ingredient | |
| Polymer 3 | 24.3 |
| Polymer 4 EB-OH 3.0K | 25.3 |
| Regalre ® 1085 | 49.7 |
| UVI 6974 | 0.5 |
| Irganox ® 1010 | 0.15 |
| Ratio of Epoxide to Hydroxyl | 2.6 |
| Adhesive Properties after | |
| UV cure and postbake: | |
| Gel of binder (w %) | 98 |
| 180° Peel steel (pli) | 5.3 a |
| TMI Loop Tack (pli) | 5.1 a |
| Polyken Probe Tack (Kg) | 1.9 a |
| SAFT to Mylar, (° C.) | >168 >168 |
| 23° C. HP steel, 1 in², 500 g (min) | 1168 v 511 v |
| 95° C. Holding Power to Mylar, 1 inch square, 0.5 Kg (min) | 0 a 0 a |

"v" is viscous splitting of the adhesive (adhesion > cohesion) and "a" is adhesive release from substrate interfaces (cohesion > adhesion).

Example 2

Adhesives 2-3, 24, and 2-8, shown in Table 2, were prepared, cast, and cured as in experiment 1. No 180° Peel testing was done because of equipment malfunction. Adhesive 2-4 had no cohesive strength at all. It remained a "goo" even after UV cure and postbake and was not sufficiently handleable to even perform the gel test, probably because neither polymer was epoxidized. Adhesive 2-4 used Polymer 5, a polymer like Polymer 3 except that it was not epoxidized. Adhesives 2-3 and 2-8 have good PSA properties.

TABLE 2

100 part formulations shown with results

| | 2-3 | 2-4 | 2-8 |
|---|---|---|---|
| Ingred. | | | |
| Polymer 3 | 24.3 | 0 | 24.2 |
| Polymer 5 | 0 | 24.3 | 0 |
| Polymer 4 | 25.3 | 25.3 | 20.2 |
| Polymer 7 | 0 | 0 | 5.0 |
| Regalrez ® 1085 | 49.7 | 49.7 | 50.0 |
| UVI 6974 | 0.5 | 0.5 | 0.5 |
| Irganox ® 1010 | 0.15 | 0.15 | 0.15 |
| w % epoxy diene polymer | 49 | 0 | 49 |
| w % hydroxy diene polymer | 51 | 51 | 51 |
| Ratio of Epoxide to Hydroxy | 2.7 | 0 | 3.1 |
| Adhes. Prop. after cure and postbake | | | |
| Gel of binder (w %) | 86 | good v | 90 |
| TMI Loop Tack (pli) | 4.8 a | good v | 3.7 a |
| Polyken Probe Tack (Kg) | 2.1 a | good v | 1.9 a |
| 23° C. HP Steel, 1 in², 2 Kg (min) | >4000 2559 a | good v | 3609 a 1133 a |
| SAFT to Mylar (° C.) | >168 111 a | good v | 67 a >168 |
| 95° C. HP Mylar, 1 in², 500 g (min) | 0 a 0 a | good v | 0 a 0 a |

Example 3

Formulations were prepared to test the concept of using blends of epoxidized diene polymers with diene monools and diols as laminating adhesives. Laminating adhesives seem to operate via an entirely different mechanism than PSA's which are cast in relatively thick layers. This thick layer is capable of absorbing much energy through viscous flow during deformation and this provides the strength of PSAs. In laminating adhesives, the layers are relatively thin and these adhesive layers must strongly join two substrates together. Because of the thinness, viscous dissipation of energy within the adhesive layer is not a dominant strength mechanism. Rather, the adhesion between adhesive and substrate must provide the required strength.

The polymers used in the laminating adhesive formulations are described in Table I and in Example 1. In particular, Polymer 13 is epoxidized I-S/EB-EB-OH, with segment molecular weights 2000–2500/1350–150-OH. The random S/EB block has a strong tendency to taper, where the styrene polymerizes last. In making Polymer 13, it was arbitrarily decided to attach the hydroxy source to a hydrogenated butadiene mer. Therefore to assure that the hydroxy source (ethylene oxide) adds to a butadiene mer, the 150 molecular weight EB miniblock was added. Polymer 13 is made by polymerizing the isoprene in cyclohexane, without ether, and after all the isoprene is polymerized, adding diethyl ether to give 6% of the total solvent. The styrene and butadiene are then added over time and polymerized to completion, followed by the remaining butadiene, after completion of the polybutadiene miniblock polymerization, the ethylene oxide is added, and then the living polymer is terminated with methanol. The polymer is partially hydrogenated to completely hydrogenate the butadiene mers and some of the isoprene mers. The styrene mers are not hydrogenated. The polymer is washed to remove the hydrogenation catalyst, and then epoxidized with peracetic acid. The epoxidized polymer is washed, stabilized with a small amount of Irganox® 1010 antioxidant, and recovered by solvent evaporation.

Formulations were made according to Table II. The ingredients were dissolved in THF to prepare a 10% solids solution. Preliminary work indicated that our curing agent, Leecure B1310, would completely dissolve in THF. Partial solubility was found using toluene as the solvent. All ingredients except the B1310 (a blocked $BF_3$ catalyst from Leepoxy, Inc.) were dissolved in THF. Once dissolved B1310 was added and the solution was placed on a roller for several minutes. The formulation was then cast on a poly (ethylene terephthalate) film to give a nominal adhesive layer thickness of 0.3 mils. The film was allowed to air dry for 1 hour. When dry, another poly(ethylene terephthalate) film was laminated to the top of the adhesive layer. The laminate was pressed together using a 2 lb roller. One inch strips were cut and then heat treated under moderate pressure at 50° C. for 60 seconds. The laminates were then tested for strength using a T-peel geometry on an Instron tensile tester. The peel rate was 10 inches per minute.

Table III shows the results for laminates as made and then aged at room temperature. The total molecular weight of Polymer 13 is low and so must experience substantial chemical crosslinking to form a load bearing network. With Polymer 13, an improvement was found by adding a monool. Compare control 2 and formulations 3-3 and 3-4. Incorporation of the monool alone (formulation 3-4) gave an increase from immeasurably low strength to 124 gli. Additional incorporation of a diol gave a further increase to 211 gli.

After aging 24 hours the cure reaction continued to proceed. Some increase in T-peel value is seen for all samples. The mode of failure is 'still cohesive (that is the adhesive layer fails (viscous splitting) rather than the interface). The trends observed for the initial T-peel values are continued at 24 hours.

Incorporation of monool or diol served to increase the strength of the laminating adhesive when the epoxidized polymer was hydroxyl terminated. The best strengths achieved are in the range of 100–400 gli initial T-peel strength.

TABLE II

Laminating Adhesive Formulations

| Ingredients | control 2 | 3-2 | 3-3 | 3-4 |
|---|---|---|---|---|
| Polymer 1 | — | — | — | — |
| Polymer 13 | 1.59 | 2.47 | 1.80 | 1.17 |
| Polymer 4 | — | 1.05 | 0.66 | 1.00 |
| Polymer 6 | — | — | — | 0.26 |
| Regalrez ® 1085 | 3.27 | 1.26 | 2.42 | 2.45 |
| Leecure B1310 | 0.16 | 0.26 | 0.18 | 0.14 |

TABLE III

T-peel Results

| Formulation | T-peel (grams per linear inch/A for adhesive, C for cohesive) | | |
|---|---|---|---|
| | 0 hrs | 24 hrs | 120 hrs |
| control 2 | 0/C | 3/C | 6/C |
| 3-2 | 33/C | 95/C | 207/C |
| 3-3 | 124/C | 119/C | 128/C |
| 3-4 | 211/C | 236/C | 277/C |

Example 4

Several performance properties of cured modified epoxy resin compositions of the present invention are important. The tensile properties such as strength, elongation, and Young's modulus are measured according to ASTM D-638. The flexural properties such as flexural modulus, stress and strain at failure are measured according to ASTM D-790. The tensile fracture toughness as characterized by the stress intensity factor ($CK_{IC}$) for crack propagation is measured according to ASTM E-399-83. Using the value of $KC_{IC}$ so measured, the fracture energy ($G_{IC}$) was calculated for the plane strain conditions employed. The adhesive properties such as lap shear stress are measured according to ASTM D-1002. The glass transition temperature ($T_g$) is measured using torsional bar dynamic mechanical analysis.

Table IV below describes the composition of the epoxidized polydiene polymers used herein. Monohydroxylated and unhydroxylated epoxidized polydienes are compared.

TABLE IV

Composition of Epoxidized Polymers

| Identification | Base Polymer Architecture | Molecular Weights (in thousands) | Styrene Content (%) | Epoxy level (meq/g) | Cloud Point (° C.) | Hydrogenated (Y/N)* |
|---|---|---|---|---|---|---|
| A | I-B-OH | 0.68–4.08 | 0 | 3.4 | 63 | N |
| Comparative | I-B | 0.88–4.08 | 0 | 4.8 | 68 | N |

*Y = Yes, N = No

In the base polymer architecture column of Table IV, B represents poly(1,3-butadiene) blocks, I represents polyisoprene blocks, and OH represents monohydroxyl functionality. Homopolymer blocks are separated by a dash.

The cloud points of blends of the,example polymers in EPON® 828 resin at a 1/9 ratio by weight are shown,in Table IV. A clear and significant advantage is shown for the monohydroxylated epoxidized polymer. Very similar cloud points are achieved for the two polymers but the polymer of the present invention achieved that cloud point with only 3.4 meq/g of epoxy, 1.4 meq/g less than the comparative unhydroxylated polymer.

11 parts of monohydroxylated epoxidized polymer A or 11 parts of the comparative monohydroxylated polymer, both having the base structure I-B were added to 100 parts of EPON® 828 resin, a diglycidyl ether of bisphenol-A. 33 parts of EPICURE® 3140 (a polyamide curing agent) per hundred parts of EPON® 828 resin plus epoxidized polymer were added to the mixture and stirred by hand. A small amount (less than 1 part per hundred parts of EPON® 828 resin plus epoxidized polymer) of PC-1344/monofunctional glycidyl epoxy solution was added to aid in defoaming the mixture. The blend was degassed in vacuum and centrifuged. The blend was cast between glass plates to make ⅛" plaques which were cured at room temperature for 7 days before testing. The mechanical properties of the resultant rubber modified epoxy resins are listed in Table V which provides a comparison of these blends and the cured epoxy resin without added epoxidized polymer.

Incorporation of Polymer A and the comparative polymer leads to increases in fracture energy ($G_{IC}$) of 192% and 92%, respectively, while maintaining good tensile and flexural properties. These results demonstrate that the these epoxidized polymers are effective at achieving a superior balance of properties in epoxy resins cured with polyamides and that the monohydroxylated epoxidized polymer gives superior results to those of the unhydroxylated epoxidized polymer even though the latter has a higher epoxy content.

TABLE V

Mechanical Properties of Modified EPON ® 828

| modifier and level | tensile properties | | | tensile fracture toughness | | flexural properties | |
|---|---|---|---|---|---|---|---|
| | strength (psi) | elongation (%) | Young's modulus (psi) | $K_{IC}$ (psi in$^{1/2}$) | $G_{IC}$ (J/m$^2$) | modulus (psi) | $T_g$ (° C.) |
| Control | 4,000 | 14 | 340,000 | 540 | 130 | 370,000 | 60 |
| Comparative | 3,800 | 14 | 310,000 | 710 | 250 | 330,000 | 60 |
| A | 4,600 | 9.6 | 330,000 | 940 | 380 | 340,000 | 63 |

Example 5

The following examples demonstrate the utility of the epoxidized monohydroxylated polymers in amino resin cured compositions. The amino resin used was CYMEL® 1156, a melamine-formaldehyde resin where R is $C_4H_9$. The acid used to catalyze the amino resin/hydroxyl and amino resin/epoxy reactions was CYCAT® 600, dodecyl benzene sulfonic acid (a 70%weight solution in isopropyl alcohol). The compositions were mixed and coated from a 65 percent by weight (% w) solids solution of the ingredients in a solvent blend composed of 90% w of an aliphatic hydrocarbon solvent, VM&P naphtha, and 10% w n-butanol. The following formulation, given in parts by weight, was used.

| Composition | pbw |
|---|---|
| Polymer | 80 |
| CYMEL ® 1156 | 18 |
| CYCAT ® 600 | 2 |
| VM&P Naphtha | 60 |
| n-Butanol | 7 |

The following polymers were tested in this formulation. Polymers 3, 4, 5, and 7 are described in Example 1. Polymer 14 was a 2000 MW polyisoprene (1)–4000 MW polystyrene/hydrogenated polybutadiene (S/EB) copolymer having a single OH on one end. The 4000 MW S/EB block in Polymer 14 was 2500 MW S and 1500 MW EB. Polymer 13 was an epoxidized version of Polymer 14 (1.5 meq of epoxy/gm polymer). Polymer 16 was a triblock polymer which had the same S/EB copolymer block as Polymer 14. However, Polymer 16 had a 1000 MW block of epoxidized polyisoprene on each end of the S/EB center block and had no OH group.

Coatings, about 2 mil thickness dry, were drawn onto aluminum panels with a #52 wire wound rod. The coatings were cured by baking 20 minutes at 175° C. They were evaluated qualitatively for their suitability for use as coatings. The following are the results.

| Polymer | Type | Appearance of Coating |
|---|---|---|
| 4 | EB-OH | Very Tacky |
| 5 | I-EB-OH | Tacky |
| 14 | I-S/EB-OH | Tacky |
| 3 | Epoxidized I-EB-OH | Non-tacky, elastomeric |
| 13 | Epoxidized I-S/EB-OH | Non-tacky, elastomeric |
| 16 | Epoxidized I-S/EB-I | Non-tacky, elastomeric |
| 7 | HO-EB-OH | Non-tacky, elastomeric |

The results with Polymer 4 clearly show that a melamine cured EB-OH monohydroxylated polydiene polymer made from only one diene monomer is not suitable for use as a coating because it is very sticky. Results with Polymers 5 and 14 show that a monohydroxylated polydiene polymer made from at least two diene monomers and subsequently selectively hydrogenating it, thereby putting an unsaturated I block on the end opposite the OH, performs significantly better than Polymer 4. However, these coatings are still not suitable because they are still sticky. Results for Polymers 3 and 13 show that epoxidation of the I block on the end opposite the OH converts the monohydroxylated polydiene polymers made from at least two diene monomers into useful coating compositions. The results for Polymers 16 and 7 confirm that a polymer with epoxy groups on both ends or an OH group on both ends is useful in coatings, as is already well known.

Example 6

Coatings made according to the present invention were evaluated for mechanical properties. The appearance (gloss) of the coatings was judged visually. The pencil hardness (gouge) of the coatings was measured according to the ASTM D3363 method of pushing successively softer pencil leads across the coating until the pencil lead will no longer gouge through the coating. The hardness scale (softest to hardest) is 6B<5B<4B<3B<2B<B<HB<F<H<2H<3H<4H<5H<6H. The methyl ethyl ketone (MEK) resistance of the coatings was measured according to the ASTM D4752 method of rubbing an MEK-moistened cloth across the coating for 200 cycles, or until breakthrough to the aluminum substrate occurred (one cycle equals one forward and one backward stroke). Adhesion of the coatings was measured with the cross hatch adhesion test, ASTM D3359, Method B. In this test, a lattice pattern is scribed through the coating, pressure sensitive tape is applied and removed, and the amount of coating removed with the tape is rated. The scale ranges from 5 (no adhesion loss) to 0 (greater than 65% adhesion loss).

The effectiveness of the monohydroxylated diene polymers in improving properties of coatings was tested in two acrylic urethane formulations using the acrylic polyol and two different triisocyanate curing agents. The hydroxyl (OH) equivalent weight of IONCRYL® 510 (80% w solids) is 500. The isocyanate (NCO) equivalent weight of DESMODUR® Z4370 (70% w solids) and DESMODUR® Z-3390 (90% w solids) are 365 and 216, respectively. The acrylic polyol and the triisocyanate curing agents were mixed at 1.1 to 1 NCO to OH molar ratio, the DABCO T-12 catalyst was added, and coatings were applied onto steel panels.

Four different polymers, all having 6000 molecular weight, were compared in the following experiments. Polymer S was an epoxidized I-EB-OH (epoxy content 1.5 meq/gm). Polymer 13 was an epoxidized I-S/EB-OH (epoxy content 1.5 meq/gm) and Polymer 14 was its unepoxidized precursor (double bond content 1.7 meq/gm). Polymer 16 was an epoxidized I-S/EB-I (epoxy content 1.2 meq/gm). The polymers were dissolved at 70% w solids content in 2-heptanone which had been previously dried with mol sieves. The polymer solutions were mixed with the triisocyanates and catalyst for about 24 hours before the acrylic polyol was added and coatings were applied onto steel panels.

| Formulation | 6-1 | 6-2 |
|---|---|---|
| Component | parts by weight (pbw) | pbw |
| JONCRYL ® 510 | 500 | 500 |
| DESMODUR ® Z-4370 | 402 | — |
| DESMODUR ® N-3390 | — | 238 |
| Polymer | 170 | 154 |
| DABCO T-12 | 0.8 | 0.8 |
| 2-Heptanone | 166 | 193 |

The solutions were checked to see if they were phase stable and those which did not phase separate were drawn down onto steel panels (D36 CRS panels from Q-Panel Corp.) using a #22 wire wound rod. The coatings were tested after being held at room temperature for two weeks. The following result were obtained.

In formulation 6-1, the solution with Polymer 5 phase separated. All the other polymers gave phase stable solutions and so were cast as coatings, the properties of which are shown in the following table.

| Polymer Properties | None | Polymer 13 | Polymer 14 | Polymer 16 |
|---|---|---|---|---|
| Thickness mil | 0.7 | 0.8 | 0.7 | 0.7 |
| Pencil hardness | 2H | H | F | F |
| MEK rubs | 14 | 3 | 2 | 7 |
| Adhesion | 2 | 4 | 4 | 4 |
| Gloss | High | High | High | High |
| Tack | None | None | None | Tacky |

The fact that Polymer 5 phase separated shows that the polymer must have some styrene in order to gain compatibility with this acrylic/isocyanate system. Polymers 13 and 14, with and without epoxy, both influenced the properties of the acrylic urethane to about the same extent—both reduced the hardness and increased the adhesion. The results on Polymer 16 show that, although its styrene content was sufficient to give a phase stable solution, it made the cured coating tacky and therefore is unsuitable. Thus, the hydroxyl group on Polymers 15 and 14 is required to achieve satisfactory performance.

In formulation 6-2, the only polymer which gave a phase stable blend was Polymer 13. These results clearly show that, in this case, styrene is required in the polymer, the I block must be epoxidized and the OH group is required. The coating properties for Polymer 13 in Formulation 6-2 are shown in the following table.

| Polymer Properties | None | Polymer 13 |
|---|---|---|
| Thickness, mil | 0.6 | 0.8 |
| Pencil hardness | 2H | 2H |
| MEK rubs | 6 | 7 |
| Adhesion | 1 | 5 |
| Gloss | High | High |
| Tack | None | None |

These results show that Polymer 13 gives a dramatic improvement in adhesion with no apparent reduction in other properties.

We claim:

1. An epoxidized monohydroxylated polydiene polymer which is comprised of at least two polymerizable ethenically unsaturated hydrocarbon monomers, wherein at least one is a diene monomer which yields unsaturation suitable for epoxidation, and wherein the polymer has been epoxidized at aliphatic double bonds to have from 0.1 to 7.0 meq of epoxy functional groups per gram of polymer.

2. The epoxidized monohydroxylated polydiene polymer of claim 1, further comprising a tackifying resin.

3. The polymer of claim 1, wherein the polymer prior to epoxidation has a structure selected from the group consisting of I-B-S-OH, I-EB-S-OH, HO-I-EB-S, and I-S/EB-OH, wherein I is an isoprene block, B is a butadiene block, EB is a hydrogenated butadiene block, S is a styrene block, and OH is a hydroxyl group.

4. The epoxidized monohydroxylated polydlene polymer of claim 1, wherein the at least two ethenically unsaturated hydrocarbon monomers are selected from the group consisting of butadiene, isoprene and styrene.

5. The epoxidized monohydroxylated polydlene polymer of claim 1 wherein said diene monomer is isoprene.

6. The epoxidized monohydroxylated polydiene polymer of claim 1, wherein the at least two ethenically unsaturated hydrocarbon monomers are butadiene and isoprene.

7. The epoxidized monohydroxylated polydiene polymer of claim 6 wherein the polymer comprises a block of the isoprene having an average molecular weight of from 100 to 6000 and a block of the butadiene having a weight average molecular weight of from 1000 to 15,000.

* * * * *

UNITED STATES PATENT AND TRADEMARK OFFICE
CERTIFICATE OF CORRECTION

PATENT NO. : 6,525,142 B1
DATED : February 25, 2003
INVENTOR(S) : James Robert Erickson, David John St. Clair and Michael Alan Masse It is certified that error appears in the above-identified patent and that said Letters Patent is hereby corrected as shown below:

<u>Column 14,</u>
Lines 38-43, claims 4 and 5 should read
    4. The epoxidized monohydroxylated" polydiene" polymer of claim 1, wherein the at least two ethenically unsaturated hydrocarbon monomers are selected from the group consisting of butadiene, isoprene and styrene.

5. The epoxidized monohydroxylated" polydiene" polymer of claim 1 wherein said diene monomer is isoprene.

Signed and Sealed this

Twenty-second Day of July, 2003

JAMES E. ROGAN
*Director of the United States Patent and Trademark Office*